United States Patent
Nguyen et al.

(10) Patent No.: US 7,233,584 B2
(45) Date of Patent: Jun. 19, 2007

(54) GROUP TDMA FRAME ALLOCATION METHOD AND APPARATUS

(75) Inventors: Gam D. Nguyen, Beltsville, MD (US); Jeffrey E. Wieselthier, Silver Spring, MD (US); Anthony Ephremides, North Bethesada, MD (US)

(73) Assignee: The United States of America as represent by the Secertary of the Navy, Washington, DC (US)

( * ) Notice: Subject to any disclaimer, the term of this patent is extended or adjusted under 35 U.S.C. 154(b) by 615 days.

(21) Appl. No.: 10/801,167

(22) Filed: Mar. 12, 2004

(65) Prior Publication Data
US 2004/0218577 A1 Nov. 4, 2004

Related U.S. Application Data

(60) Provisional application No. 60/453,517, filed on Mar. 12, 2003.

(51) Int. Cl.
*H04B 7/212* (2006.01)
(52) U.S. Cl. .............. 370/337; 370/321; 370/329; 370/347; 455/450; 455/453
(58) Field of Classification Search ........ 370/336–337, 370/329, 333, 321, 345, 347–348, 431, 442, 370/458, 459, 437–438, 390; 455/450–453, 455/447; 445/509, 515–520
See application file for complete search history.

(56) References Cited

U.S. PATENT DOCUMENTS 5,483,537 A * 1/1996 Dupuy ................. 370/337
5,594,720 A   1/1997 Papadopoulos et al.
5,805,576 A * 9/1998 Worley et al. .......... 370/337
6,006,078 A * 12/1999 Yamamoto et al. ....... 455/264

(Continued)

*Primary Examiner*—George Eng
*Assistant Examiner*—Kamran Afshar
(74) *Attorney, Agent, or Firm*—John J. Kurasck; George Legg (57) ABSTRACT

A Group TDMA multiple destination, multiple node wireless network includes a first destination having a first group of nodes (Group 1) in communication range and a second destination having a second group of nodes (Group 2) in communication range. A third group of nodes (Group 3) are within communication range of both first and second destinations. Each group of nodes is assigned a periodically recurring set of time slots for transmitting to a designated destination. A network processor is programmed for (a) dividing the frame into a number of fixed-length time slots; (b) assigning a fraction 1−x of the time slots to the first and second groups of nodes; (c) assigning a fraction x of the time slots to the third group; (d) subdividing the third group into a fourth group of nodes and a fifth group of nodes; (e) assigning a fraction y of the fraction x time slots to the fourth group for transmission to the first destination and a fraction 1−y of the fraction x time slots to the fifth group for transmission to the second destination; (f) applying a multiple-access protocol to each group in its assigned set of time slots; and (g) optimizing the values of x and y in order to realize the maximum possible value of stable throughput rate $\lambda^*$. Group TDMA provides increased throughput capacity as it provides a balance between scheduled access and pure random access. Nodes may be grouped according to geographical location as well as arbitrary criteria, such as priority or node mission.

30 Claims, 8 Drawing Sheets

U.S. PATENT DOCUMENTS

| | | | |
|---|---|---|---|
| 6,038,455 A * | 3/2000 | Gardner et al. | 455/447 |
| 6,628,636 B1 * | 9/2003 | Young | 370/337 |
| 6,894,991 B2 * | 5/2005 | Ayyagari et al. | 370/325 |
| 6,967,943 B1 * | 11/2005 | Hamalainen et al. | 370/347 |
| 6,993,339 B2 * | 1/2006 | Skillermark et al. | 455/447 |
| 7,054,643 B2 * | 5/2006 | Trossen et al. | 455/454 |
| 2003/0017830 A1 * | 1/2003 | Kayama et al. | 455/450 |
| 2003/0067906 A1 * | 4/2003 | Young | 370/347 |

* cited by examiner

GROUP TDMA FRAME ALLOCATION METHOD AND APPARATUS

The present application claims the benefit of the priority filing date of provisional patent application No. 60/453,517, filed Mar. 12, 2003, incorporated herein by reference.

FIELD OF THE INVENTION

This invention relates to a method and device for improved multiple-access capability for multihop wireless networks with multiple destinations and randomly generated traffic. More particularly, the invention consists of a means to divide user nodes into groups in a manner that provides increased throughput in wireless communications and includes a technique to optimize the allocation of slots to these user groups in periodically recurring frames so that maximum throughput is achieved while providing improved energy efficiency, i.e., reduced energy per successfully transmitted packet.

BACKGROUND OF THE INVENTION

Figure 1:
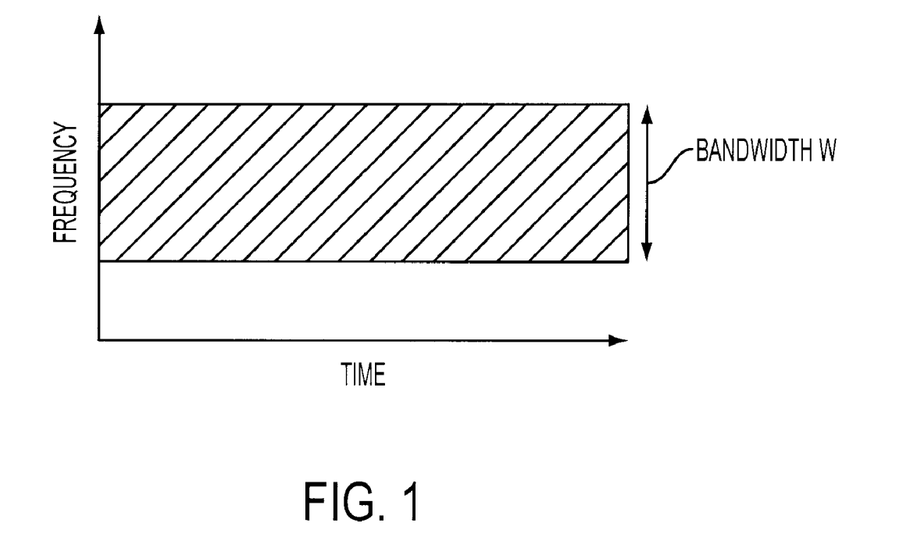
FIG. 1 shows the channel resource as a slice of the frequency-time plane.

In wireless communication systems, the RF channel resource may be viewed as a slice of the frequency-time plane, as shown in FIG. 1. The objective of the multiple-access protocol is the division of this resource among the users of the channel (who are referred to as nodes) in a manner that provides acceptable (or, ideally, optimal) performance. Common multiple access methods are TDMA (Time Division Multiple Access), FDMA (Frequency Division Multiple Access), and CDMA (Code Division Multiple Access).

Under TDMA, the channel resource is divided into time slots. For example, in a system with N users, the time axis would be divided into periodically recurring frames of length N slots, with one user assigned to each slot. Each slot uses the entire bandwidth assigned to the channel. Thus, one slot is available to each user in every frame, without the possibility of contention from other users. Under FDMA, the available frequency band is divided into frequency bands. For example, in a system with N users, the frequency band would be divided into N sub-bands, with each user assigned to its own band on a continuous basis. Again, there is no contention for channel use because the users transmit in distinct frequency bands. Under CDMA, the users are assigned pseudo-orthogonal spreading codes, thus permitting the successful simultaneous transmission of several signals.

In a time-slotted system, a packet is received successfully (with high probability) if the signal-to-interference ratio at the destination node is sufficiently high. The source of such interference may be background noise, jamming, other-user interference, etc. In this discussion, we assume that the only significant source of interference is other-user interference (i.e., background noise and other sources of interference are negligible).

When TDMA is used, there is no other-user interference because each user is assigned its own periodically recurring time slot. TDMA can provide a throughput of one packet per slot if each user generates traffic at a constant rate of one packet per frame. Delay is proportional to the number of users (and hence to the number of slots per frame). TDMA is inefficient when traffic is randomly generated, e.g., according to a Poisson process, because many slots will be left unused while some users may have several packets waiting for transmission.

Moreover, TDMA does not take advantage of the possibility of geographically separated users (who are too far apart to cause interference) transmitting in the same slot. Therefore, TDMA is inefficient in networks that have multiple destinations that are geographically separated. The terminology "multihop network" as used herein refers to such networks. Spatial TDMA approaches, which permit simultaneous transmissions to geographically separated destinations, can provide acceptable performance when the traffic is generated at a fixed rate at each node. However, when traffic is random (e.g., generated according to a Poisson process at each node) and the number of nodes is large, this approach is characterized by low throughput and large delay.

A variety of multiple-access protocols have been developed to address the medium access control (MAC) problem for applications where traffic is randomly generated. Among the best known of these are the random access protocols known as slotted Aloha and the first-come first-serve (FCFS) collision-resolution algorithm (CRA). These protocols were originally developed for single-destination systems. Random-access protocols are MAC protocols that do not assign users to slots. These instead use a contention-based mechanism, under which destructive interference (known as a collision) occurs when two or more nodes transmit in the same slot. None of the packets involved in a collision are successfully received, and all must be transmitted in future slots. Slotted Aloha can provide a throughput of $1/e=0.368$ packet/slot in a large population of bursty users, and can be stabilized to maintain this throughput level, even when the offered traffic load is greater than this value. The FCFS algorithm, which is inherently stable in single-destination systems, can provide a throughput of 0.4878 packet/slot when two well-known "improvements" are used.

"Slotted Aloha" is a random-access MAC scheme in which the users are not assigned slots. In stabilized versions of slotted Aloha, a user with a packet to transmit will do so with a probability that is typically based on recent channel feedback, i.e., whether recent slots were empty, successful transmissions (i.e., exactly one user transmitted in the slot), or collisions (two or more users transmitted in the slot). When such collisions occur, none of the packets involved in the collision are successful; therefore they must be retransmitted. It is assumed throughout this document, for all random-access protocols that are discussed, that accurate channel feedback concerning the outcome of each slot is available to all network nodes immediately following the slot.

The "First-Come First-Serve (FCFS)" collision-resolution algorithm (CRA) is another type of random-access scheme in which the users are not assigned slots. It differs fundamentally from slotted Aloha by its structured transmission policy, which is summarized as follows. All packets that arrived in some time interval (known as the "allocation interval") are transmitted in some slot. If a collision occurs, the interval is split into two smaller subintervals, and the packets that arrived in the first subinterval are retransmitted in the next slot. This subinterval is further split if another collision results, and so on. A throughput of 0.4878 is realized by the FCFS splitting algorithm upon implementation of certain "improvements," which are defined as follows.

The "first improvement" in FCFS addresses the case of a collision that is followed immediately by an idle slot. Straightforward application of the FCFS algorithm guarantees that a collision will occur in the next slot. To avoid such wasting of a slot, the algorithm acts as if the collision had already occurred, and shortens the allocation interval accordingly.

The "second improvement" (which has a somewhat smaller impact on achievable throughput than does the first improvement) incorporates the right (i.e., later) half of the allocation interval involved in the original collision into subsequent collision resolution periods. The combined effect of using both the first and second improvements provides a maximum stable throughput of about 0.4878. Use of the second improvement alone provides a maximum stable throughput of about 0.447.

The operation of slotted Aloha and CRAs heavily depends on the feedback information that each participating node receives from the destinations immediately after every slot. This feedback indicates whether the channel in the previous slot was idle, had a collision, or had successfully carried a packet. In multiple-destination networks, some nodes are within communication range of only one destination, while others may be within range of two or more destinations. Consequently, packets intended for one destination are subject to collisions with packets intended for one or more of the other destinations. In addition to this obvious increase in interference, feedback information can be misinterpreted because there is no way to identify the intended destination of a packet that suffers a collision.

Figure 2:
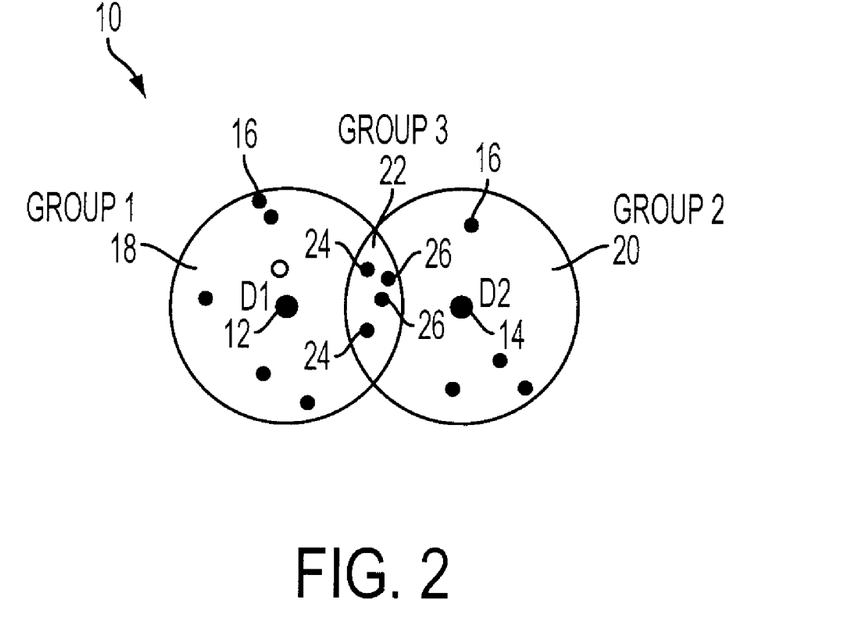
FIG. 2 shows a schematic representation of a two-destination network that contains a region in which the nodes are within communication range of both destinations.

FIG. 2 shows a network 10 with two destinations 12 and 14 (D1 and D2, respectively) and a number of nodes 16 that are within communication range of them (assuming the same fixed communication range for all nodes and the use of omnidirectional antennas). A first group 18 ("Group 1") is the set of nodes within communication range of only D1; similarly a second group 20 ("Group 2") is the set of nodes within range of only D2. A third group 22 ("Group 3") is the set of nodes that are within range of both D1 and D2 (i.e., the intersection of the two circular regions). The discussion here is based on a simplified interference model in which a node can cause interference (i.e., a collision) only if it is within communication range. However, the concepts described below are applicable to any interference model.

Nodes in Group 1 randomly generate packets for transmission to D1; similarly nodes in Group 2 randomly generate packets for transmission to D2. Nodes in Group 3 randomly generate packets for transmission to either D1 or D2; once a destination is chosen for a particular packet, the packet must be delivered to that destination (i.e., no reward is received for successful reception at the wrong destination). Group 3 is subdivided into two parts: a fourth group 24 ("Group 31") nodes are intended for D1 and a fifth group 26 ("Group 32") nodes are intended for D2. Since packets from Group 3 reach both destinations, they are potentially a source of collisions at both the intended and nonintended destination. Therefore, throughput is reduced.

In view of the improved performance provided by FCFS over slotted Aloha, it would be desirable to be able to exploit this advantage in two-destination systems as well. However, the best version of FCFS (which incorporates the "first improvement" and "second improvement," both of which were described earlier) is subject to a deadlock condition in two-destination or other multiple destination systems with overlapping user populations, as is discussed in J. E. Wieselthier, G. D. Nguyen, and A. Ephremides, "Multiple Access for Multiple Destinations in Ad Hoc Networks," *Proceedings of Modeling and Optimization in Mobile, Ad Hoc and Wireless Networks (WiOpt'03)*, Sophia-Antipolis, FRANCE, Mar. 3–5, 2003, and in G. D. Nguyen, J. E. Wieselthier, and A. Ephremides, "Contention-Resolution Algorithms for Multiple Destinations in Wireless Networks," *Proceedings of the 2003 Conference on Information Sciences and Systems*, Johns Hopkins University, Baltimore, Md., Mar. 12–14, 2003, both of which are incorporated herein by reference.

The "first improvement" makes the FCFS algorithm vulnerable to errors in the feedback process. Consider first the case of a single-destination network. For example, if an idle slot is erroneously interpreted as a collision, the allocation interval is then split because it is believed that a collision has occurred. However, since there are actually no packets in the allocation interval, the result is an empty slot. Use of the first improvement results in further reduction of the empty allocation interval, a process that continues indefinitely, resulting in deadlock.

Now consider Destination 1 in a multiple-destination system. Collisions of packets that are intended for another destination (or destinations) result in a collision being heard at Destination 1, even though no packets intended for Destination 1 were actually transmitted in that slot. Because of this collision, the allocation interval associated with Destination 1 is split indefinitely, as described above for the single-destination case, again resulting in deadlock.

When the first improvement is not used, splitting algorithms are extremely insensitive to feedback errors. In applications where such errors are rare, it may be appropriate to simply suspend the splitting of the interval after observing several such idle slots. However, it may be best not to use the first improvement at all when such errors are frequent. The case of multiple destinations creates a situation that is similar to that of frequent feedback errors. Therefore, the first improvement should not be used in multiple-destination networks that use a straightforward implementation of the FCFS algorithm, which we refer to as "free-running FCFS." If the first improvement is not incorporated into the algorithm, the network is no longer subject to such deadlocks; however throughput is reduced to approximately 0.447 in single-destination networks (which is still higher than that of slotted Aloha).

There remains, therefore, a need to develop a channel-access protocol that can provide at least some of the benefits of the first improvement (specifically its increased throughput), without being vulnerable to the deadlock situation described above.

SUMMARY OF THE INVENTION

According to the invention, a Group TDMA multiple access, multiple destination, multiple node wireless network includes a first destination having a first group of nodes (Group 1) within communication range thereof and a second destination having a second group of nodes (Group 2) within communication range thereof, and a third group of nodes (Group 3) that are within communication range of both first and second destinations. Each group of nodes is assigned a periodically recurring set of time slots for transmitting to a designated destination. The network includes a processor programmed for (a) dividing the frame into a number of fixed-length time slots; (b) assigning a fraction 1−x of the time slots to the first and second groups of nodes; (c) assigning a fraction x of the time slots to the third group; (d) subdividing the third group into a fourth group of nodes (Group 31) and a fifth group of nodes (Group 32); (e) assigning a fraction y of the fraction x time slots to the fourth group for transmission to the first destination and a fraction 1−y of the fraction x time slots to the fifth group for transmission to the second destination; (f) applying a multiple-access protocol to each group in its assigned set of time slots; and (g) optimizing the values of x and y in order to realize the maximum possible value of stable throughput rate λ*.

Also according to the invention, a Group TDMA method of providing multiple-access in a multiple destination, multiple node wireless network includes the above steps (a)–(g). Preferably, the frame duration is adjusted in order to facilitate the implementation of the optimal values of x and y, as is discussed below. The values of x and y are preferably optimized in accordance with the algorithm of the invention described below in more detail.

The Group TDMA invention is intended for use in conjunction with a conventional channel access protocol (e.g., slotted Aloha or FCFS). The use of Group TDMA permits the use of throughput-enhancing improvements to FCFS while eliminating the possibility of deadlock. In one embodiment, Group TDMA provides increased throughput for slotted Aloha, and a further increase in throughput for FCFS.

The Group TDMA approach imposes a time-division structure that creates an orthogonality among groups of nodes that interfere with each others' feedback process. When the FCFS algorithm is used, such a time-division structure eliminates the deadlock situation described above, and therefore permits the use of the first improvement, particularly when feedback errors caused by channel noise are negligible.

Group TDMA provides a balance between scheduled access (i.e., contention-free TDMA-based schemes) and pure random access. For example, if exactly one user is assigned to each group, contention-free TDMA operation is obtained. At the other extreme, if there is a single group, the protocol becomes random access (e.g., slotted Aloha or FCFS).

Groups may be formed based on the geographical location of the nodes, and it is also possible to group the nodes based on any arbitrary criterion, e.g., on priority, or on natural membership in a group based on the mission of the node.

Group TDMA, when used in conjunction with the FCFS algorithm, provides increased capacity, as compared to the use of a "free-running" scheme in which FCFS is run independently for the two destinations (where packets intended for one destination can interfere with those intended for the other). The reason for this improved performance is that Group TDMA permits the use of the "first improvement," thus providing increased throughput. (In the free-running scheme, use of the first improvement would make the system susceptible to deadlock, as discussed earlier.)

Additional features and advantages of the present invention will be set forth in, or be apparent from, the detailed description of preferred embodiments which follows.

DETAILED DESCRIPTION OF THE PREFERRED EMBODIMENTS

DEFINITIONS: As used herein, the following terms are defined as:

"Slot": is the basic time unit used in the system description. The duration of each packet is one slot. Furthermore, it is assumed here that time is slotted, i.e., each packet's transmission can begin only at the beginning of a time slot.

"Frame": is used in the sense of time division multiplexing, in which a frame consists of a number of time slots.

"Frame duration": the sum of all the unit time intervals ("slots") of a frame. This is also the time from the start of one frame until the start of the next frame. In the context of this invention, all frames are of the same fixed length.

Slotted Aloha and FCFS may be viewed as fundamental algorithms because they provide a means to directly share a multi-user channel. By contrast, reservation schemes typically require the use of a separate reservation channel, which may actually use a fundamental scheme such as slotted Aloha or FCFS to make the reservations. Alternatively, carrier-sense multiple access (CSMA) schemes may be viewed as having an implicit reservation mechanism. (The well-known 802.11 protocol uses a CSMA scheme with collision avoidance.) The invention, however, is directed to systems employing fundamental algorithms such as slotted Aloha and FCFS, which do not make use of either explicit or implicit reservation mechanisms.

A communications network typically includes a group of nodes interconnected by a transmission medium. The term "node" relates to any device that shares packets of data with other nodes in the network. A node may be a transmitter, receiver, communications relay, telephone, television, a set-top box for televisions, a camera or other electronic sensing or communication device. A node may also be other devices having modem or other communications transmitting/receiving capabilities, e.g. computers, printers, scanners, etc. Accordingly, any device that can send and/or receive frames of data with other devices via a communication medium may be a node for purposes of the present invention.

In the context of the invention described here, a potentially large population of possibly mobile nodes desires to communicate with a much smaller number of destinations.

Group TDMA can also be used when interference range is greater than communication range. In such cases, it would be necessary to further subdivide the nodes into additional groups, based on which nodes cause interference at the specific destinations. However, the basic approach would still be applicable. The discussion in this record and disclosure of invention is based on the simplified interference model.

For example, consider FIG. 2. Based on the simplified interference model discussed above, the nodes in Group 1 and Group 2 can transmit simultaneously without any interference between the two groups. The nodes in Group 3 would interfere with those in both Group 1 and Group 2, as well as with all Group 3 nodes (regardless of whether the intended destination is D1 or D2). That is, owing to the broadcast nature of the wireless channel, packets originating from Group 3 will reach both D1 and D2, even though each packet is intended for only one specific destination. Thus, these packets can cause collision at both destinations. Although the destinations and nodes are illustrated as fixed, that is none are shown as mobile, it should be understood that the invention also extends to mobile communications and destinations.

As shown in FIG. 2, a node can receive feedback from one or two destinations, depending on which group it belongs to. In particular, Group 1 nodes receive only D1's feedback (not D2's feedback); Group 2 nodes receive only D2's feedback (not D1's feedback). However, Group 3 nodes receive both D1 and D2's feedback. It is assumed that all feedback is received in a reliable and contention-free manner.

In a basic "free-running" implementation of the FCFS algorithm with two destinations, the nodes use the feedback provided by only their intended destination, with no attempt to reduce interference among packets that are intended for different destinations. For example, D1's neighbors are all the nodes in Group 1 and Group 3. D1 hears all of its neighbors' transmissions (even though some of the Group 3 transmissions are intended for D2). As in the single-destination case, D1's feedback for a slot in which none of its neighbors transmits is 0 (for an empty slot). If exactly one of its neighbors transmits, one must distinguish between two cases; the feedback is 1 (for a success) if the packet was, in fact, intended for D1; it is 0 if the packet is a Group 3 packet that was intended for D2. Whenever more than one of D1's neighbors transmits (regardless of their intended destinations), the feedback is e (for collision). When a collision occurs, it is not possible to determine the intended destination(s) of the packets that are involved.

In this simple implementation, nodes in Group 3 make use of the feedback transmitted by only their intended destination, even though they receive feedback from both destinations. There is no coordination of the collision-resolution processes at the two destinations. Their allocation intervals are determined independently, as are the beginning and end points of the collision resolution intervals. The difference between this problem and that of a single destination results from the interference (collisions) caused by packets in Group 3 that are intended for the other destination. It was noted above that splitting algorithms (for a single destination) are extremely insensitive to feedback errors when the first improvement is not used.

In simulations of the two-destination problem the straightforward implementation of the FCFS algorithm without the first improvement functions correctly (albeit at reduced throughput levels as compared to the single-destination network) despite the introduction of collisions with packets intended for the other destination. However, when the first improvement is used, a collision that involves only packets intended for D2 will be interpreted as a collision at D1 as well. Consequently, D1's allocation interval will be reduced indefinitely even though it is empty. The situation is analogous to that of erroneous feedback in the single-destination case, in which an idle slot is interpreted as a collision. Therefore, a deadlock occurs. A detailed example is provided in J. E. Wieselthier, G. D. Nguyen, AND A. Ephremides, "Multiple Access For Multiple Destinations In Ad Hoc Networks," *Proceedings Of Modeling And Optimization In Mobile, Ad Hoc And Wireless Networks* (*WIOPT'03*), Sophia-Antipolis, France, Mar. 3–5, 2003, incorporated herein by reference.

This type of deadlock is not a rare event, and the high likelihood of its occurrence, even in networks with no feedback errors, suggests that it is not advisable to use the first improvement in multiple-destination scenarios. However, this problem can be eliminated by using the time-division strategy, described further below, that forms the basis for the group tdma invention.

It is assumed that there is no interference between feedback packets; they are all received correctly. The difficulty arises because data packets intended for one destination can cause collisions at the other destination, thereby resulting in feedback that incorrectly characterizes the collision-resolution process.

To eliminate the complications created by the two-destination scenario, a time-division structure is imposed that creates an orthogonality among groups of nodes that interfere with each others' feedback process. Such a time-division structure eliminates deadlock situations such as the one described above, and would therefore permit the use of the first improvement (assuming that feedback errors caused by channel noise are negligible).

The invention establishes a time-division approach for allocating the time slots to appropriate packets. It is assumed that the overall arrival rate to the network is defined to be λ, which is divided among the groups as follows:

$f_i$=fraction of arrivals from Group i, i∈{1, 2, 3}

$f_{3j}$=fraction of arrivals from Group 3j, j∈{1, 2} where $f_1+f_2+f_{31}+f_{32}=1$ and $f_3=f_{31}+f_{32}$. It is assumed that $f_1$, $f_2$, $f_{31}$, and $f_{32}$ are known statistics. Thus, the arrival rate to the network from Group i is $\lambda f_i$. The optimization procedure described below, and the resulting performance when time slots are optimally assigned to groups, are based on the assumption that the arrival process is Poisson. however, the group TDMA concept of assigning slots to groups is valid for any arrival process.

Figure 3:
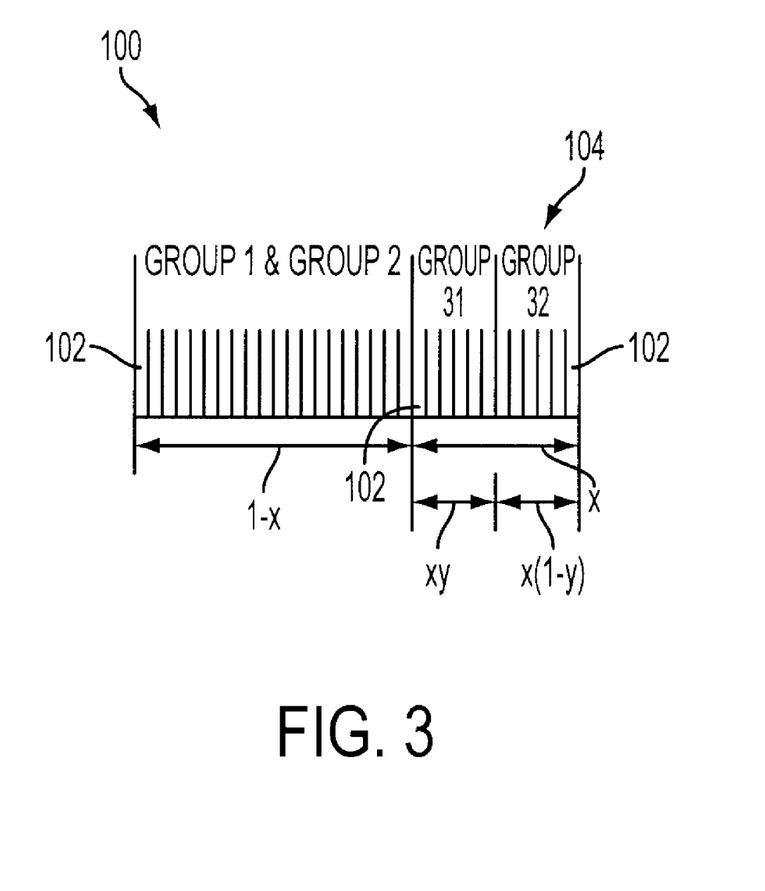
FIG. 3 shows a schematic representation of a frame and time slot allocation according to the invention.

Referring now to FIG. 3, according to the invention, a periodic framed structure 100 is implemented, in which the time slots 102 in each frame 104 are divided among the groups of users, i.e., Groups 1, 2, and 3. A fraction x of the slots is assigned to Group 3; this fraction is further subdivided between the Group 31 and Group 32, where xy is allocated to Group 31 and x(1−y) to Group 32. The remaining fraction 1−x is assigned to Group 1 and Group 2 (recall that both groups can transmit simultaneously without interference between the groups). The allocation of groups of slots to these four groups of users (i.e., Groups 1 and 2 in the same set of slots, and Groups 31 and 32 in different sets of slots) is the fundamental idea that creates an orthogonality among the feedback processes of the various groups of users.

Additionally, the invention is directed to optimally allocating the slots, that is, to determine the fractions x and y that provide the maximum value of "stable" throughput λ* (for specified values of $f_1$, $f_2$, $f_{31}$, and $f_{32}$), i.e., the maximum throughput such that the expected backlog of packets remains finite for all groups. Although as shown the slots allocated to the various groups are contiguous blocks of slots, the slots may also be interleaved. The frame length is adjustable and is preferably of sufficient length so that the optimal slot apportionment (i.e., the fractions x and y) can be implemented exactly.

In the discussion of the optimization procedure and performance results, it is assumed that the algorithm processes only the feedback from the destination for which the packet is intended; the algorithm ignores the feedback from the non-intended destination. More specifically, in a two-destination network packets intended for D1 use only D1's feedback, while packets intended for D2 use only D2's feedback. Although there are two types of feedback, a single set of time slots is utilized for all data packets, e.g., see FIG. 3. The invention also includes implementations of group TDMA where nodes in group 3 use the feedback they receive from both destinations.

Let $S_{max}$ be the maximum stable throughput achievable in the single destination case. For example, under the assumption of Poisson arrivals, $S_{max}=1/e=0.368$ for the stabilized, slotted Aloha algorithm, and $S_{max}=0.4878$ for the FCFS splitting algorithm (with its improvements). Recall that $\lambda$ denotes the overall arrival rate for the two-destination system. Thus, any stable throughput $\lambda$ for the two-destination system must satisfy the following constraints:

$$\lambda f_1 \leq (1-x)S_{max} \qquad (1)$$

$$\lambda f_2 \leq (1-x)S_{max} \qquad (2)$$

$$\lambda f_{31} \leq xy S_{max} \qquad (3)$$

$$\lambda f_{32} \leq x(1-y)S_{max} \qquad (4)$$

Thus, to find the maximum stable throughput of Group TDMA for this two-destination example, we maximize $\lambda$ over the quantities x and y subject to (1)–(4), i.e., we find the quantities x* and y* that result in the maximum possible value of $\lambda^*$. The solution of this optimization problem is $$x^* = \frac{f_3}{f_3 + \max(f_1, f_2)} \qquad (5)$$

$$y^* = \frac{f_{31}}{f_3} \qquad (6)$$

where $f_3=f_{31}+f_{32}$. These values of x* and y* produce a maximum throughput value of $$\lambda^* = \frac{S_{max}}{f_3 + \max(f_1, f_2)} \qquad (7)$$

Figure 4:
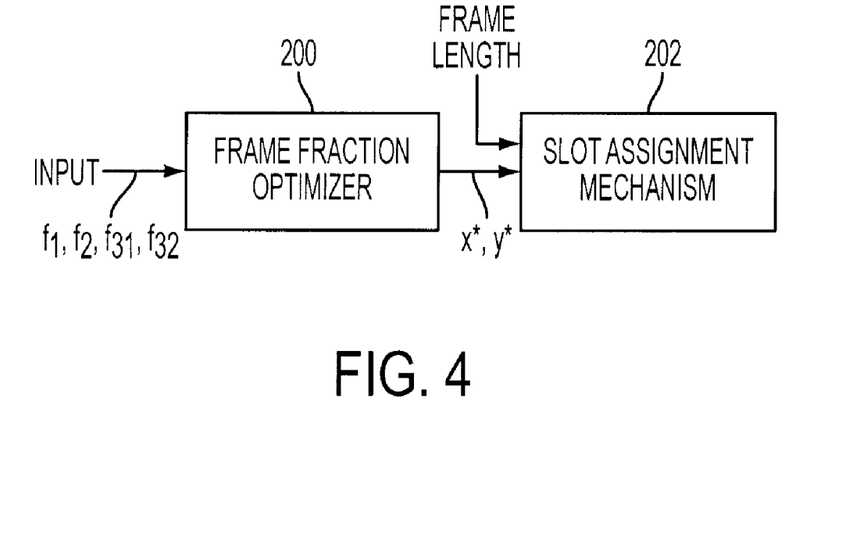
FIG. 4 shows a block diagram of the Group TDMA protocol.

A system block diagram is shown in FIG. 4. A network processor 200 is programmed in accordance with the above equations 1–7, with values assigned to the parameters as discussed, as a "frame fraction optimizer" for determining the optimal values of the fractions x* and y* that produce the maximum value of throughput $\lambda^*$, for specific values of the traffic fractions $f_1$, $f_2$, $f_{31}$, and $f_{32}$. The frame length, which is defined as an integral number of slots, may be either pre-specified, or may be chosen to facilitate the implementation of the optimal allocation fractions x* and y*. An optional processor 202 (alternatively, processor 200 can be programmed to include the function of processor 202 and a single processor used) is programmed as a "slot assignment mechanism" using the fractions x* and y*, in conjunction with the frame length, to determine which slots are assigned to each of the groups of users. Note that this assignment may be either in contiguous groups of slots (as shown in FIG. 3), or alternatively the slots assigned to each group may be interleaved, i.e., dispersed throughout the frame length, in a manner determined by the fractions x* and y*.

Group TDMA can be implemented in either a centralized or distributed manner. In a centralized implementation, a central controller such as processor 200 uses the values of the input parameters ($f_1$, $f_2$, $f_{31}$, and $f_{32}$ and frame length) to determine the slot assignment for the various groups of slots. In a distributed implementation, each of the destinations is given the values of the input parameters, which each destination uses to compute the slot assignment using a processor such as processor 200. Since all of the destinations are given the same values of the input parameters, and since deterministic algorithms are used to determine the optimal values of x* and y* (and therefore the slot assignments), each destination can independently compute the same slot assignment schedule. Denote $S_{total}$ as the stable maximum throughput for the two-destination case; i.e., $$S_{total} = \lambda^* = \frac{S_{max}}{f_3 + \max(f_1, f_2)} \qquad (8)$$

Note that $S_{total}$ is the total maximum throughput for the two-destination network. Thus, from (8), the maximum throughput per destination $S_{norm}$ is $$S_{norm} = \frac{S_{total}}{2} = \frac{S_{max}}{2(f_3 + \max(f_1, f_2))} \qquad (9)$$

A "symmetric system" is defined as one in which $f_1=f_2=(1-f_3)/2$, and $f_{31}=f_{32}=f_3/2$. From (9), the maximum throughput per destination becomes $$S_{norm} = \frac{S_{max}}{1 + f_3} \text{ (symmetric case).} \qquad (10)$$

For example, if $f_3=0.4$ (i.e., 40% of the packets are generated in Group 3, half of which are intended for D1 and half for D2) and the nodes in each group use the FCFS splitting algorithm with its improvements for which $S_{max}=0.4878$. Then, from (10), we have $S_{norm}=0.4878/1.4=0.3484$.

Figure 5:
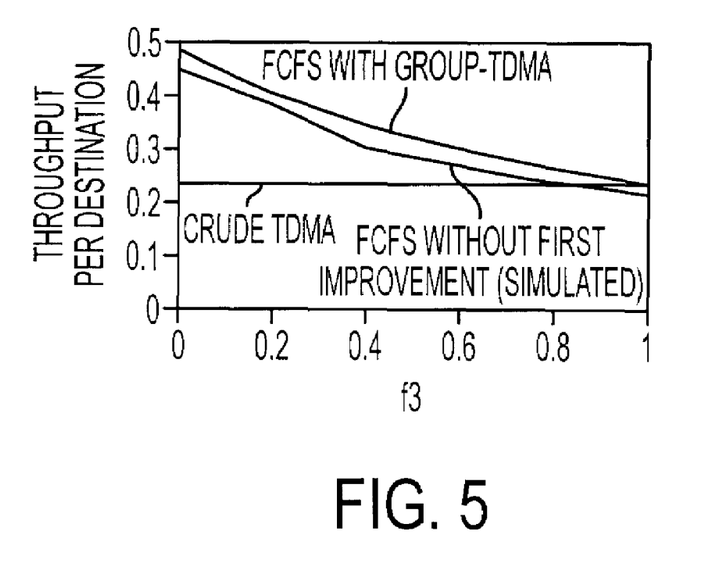
FIG. 5 shows a graph of throughput per destination for two-destination collision resolution in a symmetric network, as a function of the overlap fraction $f_3$ according to the invention.

FIG. 5 shows $S_{norm}$ (the throughput per destination) versus the overlap fraction $f_3$ for a two-destination symmetric example for three MAC schemes. "Crude TDMA" refers to a "baseline" slot assignment in which half of the slots are allocated to nodes whose destination is D1, and the other half are allocated to nodes whose destination is D2 (with no distinction being made as to whether the nodes are within range of only a single destination or both of them).

The upper curve, which is obtained from (10), is for Group TDMA when each group uses the FCFS algorithm with both the first and second improvements, for which $S_{max}=0.4878$. Better performance of the Group TDMA is due to the use of the first improvement. Use of Group TDMA, which as shown advantageously permits the use of the first improvement with the FCFS algorithm, provides the best performance over all values of $f_3$. In the extreme case of $f_3=1$ (and thus all users are within range of both destinations), this scheme is equivalent to Crude TDMA (since Groups 1 and 2 are empty). These results are obtained from Eq. (10).

The curve labeled "FCFS without first improvement" is for the FCFS algorithm without the first improvement (to avoid the deadlock situation as discussed above). The curve corresponds to the "free-running" implementation in which the FCFS algorithm is run independently for the two destinations (i.e., Group TDMA is not used). Thus, nodes in Group 3 can cause collisions at the destination to which they are not intended. Since use of the first improvement in this scenario can lead to deadlock, it is not used in this case. These results are obtained by simulation.

The curves in FIG. 5 show that the orthogonal time division of transmissions via Group TDMA can provide better throughput performance when FCFS is used. The reason for the improved performance is that Group TDMA, permits use of the first improvement. Use of the first improvement, which is enabled by the use of Group TDMA, also provides improved energy efficiency, as is demonstrated in J. E. Wieselthier, G. D. Nguyen, and A. Ephremides, "Medium Access Control in Multihop Networks," *Proceedings of IEEE MILCOM* 2003, Boston, Mass., Oct. 13–16, 2003, incorporated herein by reference.

A collision occurs when two or more packets reach the same receiver in the same slot. Since none of these packets are successful, energy is wasted. The "energy cost" per packet of a MAC protocol is defined to be the average energy required to successfully deliver a packet. Here, it is assumed that each packet is transmitted using the same value of RF transmitter power, and hence the same value of energy; we arbitrarily set the energy per transmission equal to 1. Hence, the energy cost of the MAC protocol is the average number of times a packet is transmitted. In standard single-destination applications, use of the first improvement provides not only higher throughput, but also lower energy cost per packet, as is demonstrated in the above reference.

Figure 6A:
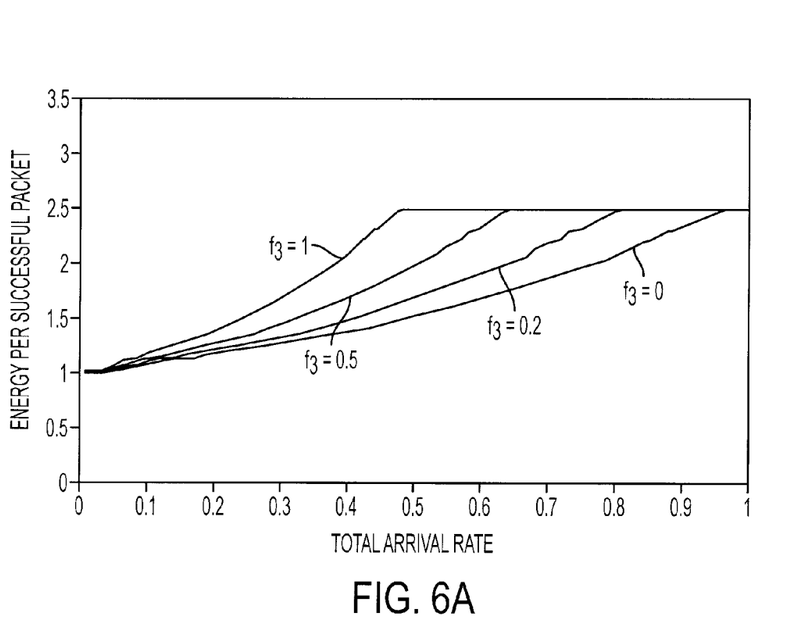
FIG. 6(a) shows the energy cost per successful packet for a symmetrical two-destination case for Group TDMA with an FCFS algorithm incorporating the first improvement according to the invention.
Figure 6B:
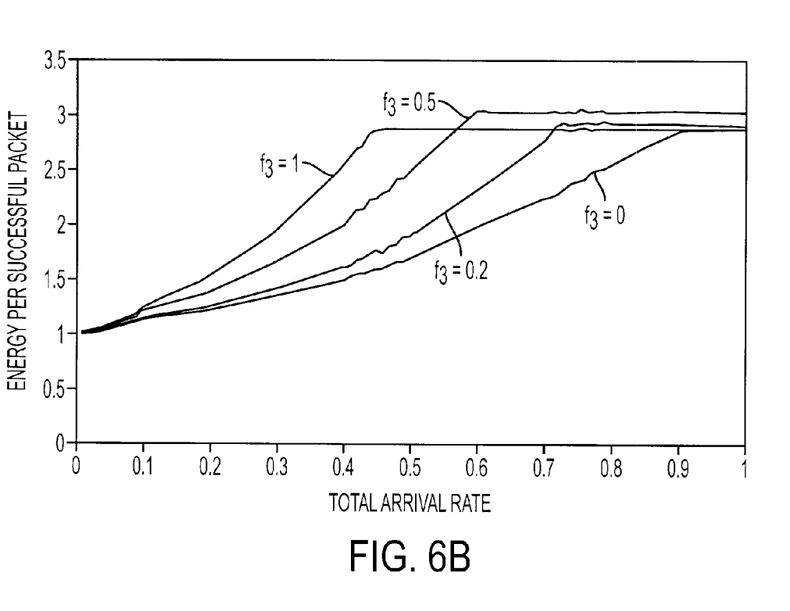
FIG. 6(b) shows the corresponding results for the free-running FCFS system without the first improvement.

FIG. 6A shows the energy cost per successful packet for the symmetrical two-destination case when Group TDMA is used in conjunction with the version of the FCFS algorithm that incorporates the first improvement. Results are shown for several values of $f_3$ (specifically for $f_3$=0, 0.2, 0.5, and 1). FIG. 6B shows the corresponding results for the free-running FCFS system without the first improvement. An examination of the saturation value of these curves (i.e., the maximum value of these curves, which remains essentially constant when the arrival rate becomes sufficiently high) indicates that Group TDMA provides significant improvement in energy efficiency (i.e., lower value of energy per successful packet), as compared to the free-running case.

The throughput of Group TDMA can be further improved by recognizing that the transmissions by nodes in Group 1, since they are not heard by destination D2, do not interfere with those of Group 32 (although Group 32 packets do interfere with Group 1 packets). Therefore, the overall throughput can be increased by permitting nodes in Group 1 to transmit during the slots that are allocated to Group 32. This technique can be used with any random-access protocol used in conjunction with Group TDMA, e.g., FCFS or slotted Aloha. When operating at maximum throughput, a majority of the slots allocated to Group 32 are occupied, thus resulting in a high likelihood of destructive interference (collisions) for Group 1. Nevertheless, some of the slots are not occupied by packets from Group 32, thus permitting Group 1 nodes to transmit some packets successfully, resulting in increased throughput for Group 1 users, without impacting unfavorably on traffic from Group 32. Note that the "first improvement" for FCFS cannot be used for the Group 1 packets that transmit in Group 32 slots because of the danger of deadlock, as discussed above. However, the Group 32 packets can use the first improvement. This also applies to the case of permitting nodes in Group 2 to transmit during the slots that are allocated to Group 31. However, use of this throughput-increasing technique results in degraded energy efficiency (i.e., higher energy cost per successful packet) because of the increased incidence of collisions.

The above discussion relates to two-destination networks. The invention applies generally to multiple destination networks as well. As before, it is desired to avoid the detrimental effect of misleading channel feedback (that can lead to deadlock) by scheduling groups of packets for transmission based, e.g., on their location and on the desired destination. Referring now to a multiple destination network 300 shown in FIG. 7, let M be the number of destinations 302, which below are labeled as 1,2,K,M. Each destination 302 ("m") defines a circle centered at m (numbered 1–3 as shown). These circles and their intersections result in regions that are non-overlapping. Suppose that A is a set of destinations; denote $R_A$ as the region consisting of the nodes that are within communication range of all the destinations in A, and are outside the range of any destination in $A^C$. For example, consider a 3-destination network (M=3), with {1, 2, 3} as the set of destinations as shown. Let A={1, 2} be the set of destinations 1 and 2; then $A^C$={3}. Thus, $R_{\{1,2\}}$ is the set of nodes that are within communication range of both destinations 1 and 2, but are outside of the range of destination 3. A packet is defined to be of type (A, m) if this packet is generated by a node in region $R_A$ and is intended for destination m. Further, let f(A, m) be the probability that a packet is of type (A, m). It is assumed that f(A, m) is a known statistic for each packet type (A, m). As in the two-destination case above, let x(A,m) be the fraction of the time slots that are allocated to type-(A, m) packets. Then $$\sum_{(A,m)} x(A, m) = \sum_{(A,m)} f(A, m) = 1 \tag{11}$$

Figure 7:
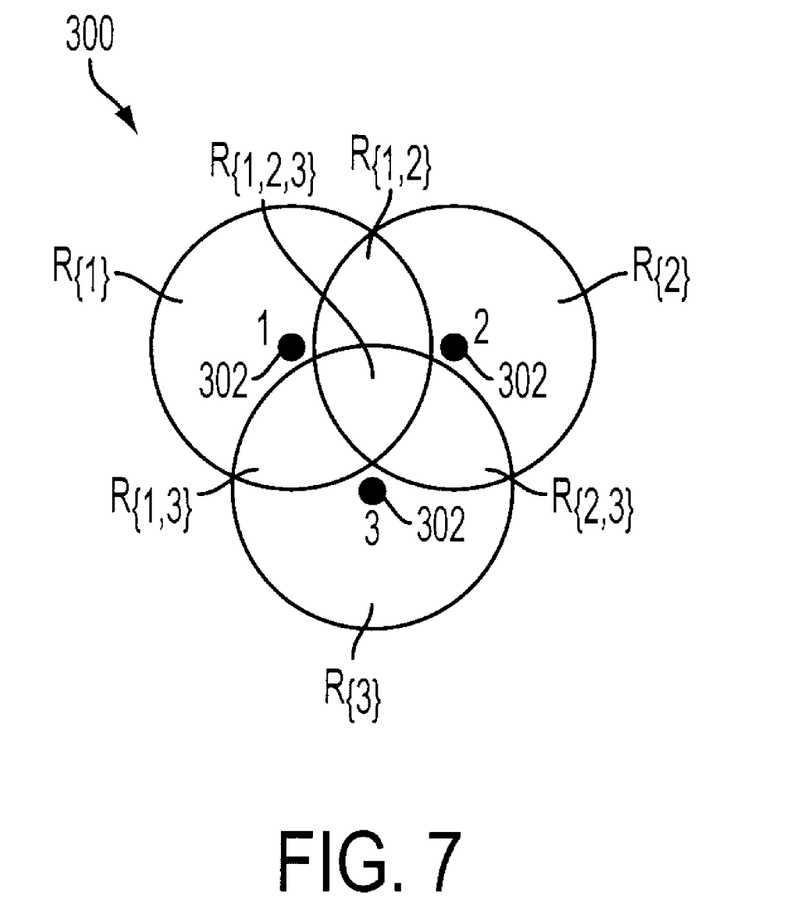
FIG. 7 shows a schematic representation of a three-destination network with overlapping regions according to the invention.

Because the M-destination network is stable, it follows that, for each (A, m), $$\lambda f(A,m) \leq x(A,m) S_{max}. \tag{12}$$

The expression in (12) represents a system of linear inequalities, which is a generalization of (1)–(4). Then, x(A,m) is determined such that λ in (12) is maximized, and the resulting optimal values x*(A,m) and λ* are found, as in the two-destination analysis discussed above.

Figure 8:
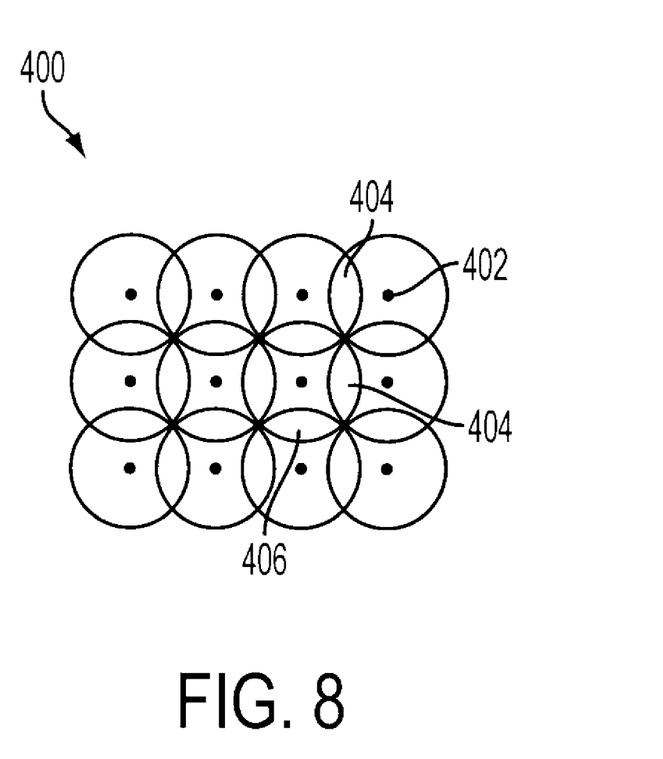
FIG. 8 shows a cellular-like multihop network according to the invention.

The extension and applicability of the three-destination model to multi-destination systems such as cellular networks can be demonstrated as follows. FIG. 8 shows an example of a cellular-like multihop network 400. Base stations 402 are located on a grid at unit intervals, and may be described by their coordinates (i,j), where i and j are integers. For example, the base stations in the top row of the figure are (1, 1), (1, 2), etc. Both the communication and interference ranges are assumed to be √2/2. The transmitting nodes (not illustrated), are uniformly distributed throughout the region. Nodes that are in the central region associated with each base station are within range of only that base station. Nodes that are in the horizontal "football-shaped" regions 404 are within range of two base stations, i.e., the one above and the one below; similarly nodes that are in the vertical football-shaped regions 406 are within range of the base stations to the right and to the left. Transmitting nodes can be divided into three groups that don't interfere with each other. One possible arrangement is as follows:

Group 1: the nodes in the central regions surrounding each base station;

Group 2: the nodes in the football-shaped regions that are transmitting to base stations with coordinates that are (odd, odd) and (even, even).

Group 3: the nodes in the football-shaped regions that are transmitting to base stations with coordinates that are (odd, even) and (even, odd).

Thus, the slots can again be divided into three groups, one to accommodate each group, as in the two-destination case. Note that all base stations are scheduled to receive in the Group 1 slots; since the central regions don't overlap with each other, they do not interfere with each other. In the Group 2 slots, half of the base stations are scheduled to receive from their neighboring football-shaped regions. Similarly, in the Group 3 slots, the other half of the base stations are scheduled to receive In a symmetric system, i.e., one in which the new packet generation rate is uniform throughout the region covered by the network, and in which packets generated by nodes in the football-shaped regions are equally likely to be intended for either of the neighboring base stations, it is straightforward to show that the solution shown earlier for the two-destination case applies here as well (as long as the packet generation probabilities are appropriately defined).

Group TDMA provides a balance between scheduled access (i.e., contention-free TDMA-based schemes) and pure random access. For example, if exactly one user is assigned to each group, contention-free TDMA operation is obtained. At the other extreme, if there is a single group, the protocol becomes random access (e.g., slotted Aloha or FCFS).

Groups are formed based on the geographical location of the nodes. It is also possible to group the nodes based on any arbitrary criterion, e.g., priority or natural membership in a group based on the mission of the node.

Group TDMA, when used in conjunction with the FCFS algorithm, provides increased capacity, as compared to the use of a "free-running" scheme in which FCFS is run independently for the two destinations (where packets intended for one destination can interfere with those intended for the other). The reason for this improved performance is that Group TDMA permits the use of the "first improvement," thus providing increased throughput. (In the free-running scheme, use of the first improvement would make the system susceptible to deadlock, as discussed earlier.) Group TDMA also provides increased capacity when used in conjunction with other random access systems, such as Slotted Aloha.

The invention described above is directed to the sharing of the RF channel by means of time slotting, rather than by frequency division or code division, and the above description of the invention therefore concentrates on the use of time slotting. Nevertheless, it should be understood that the invention also includes frequency-division or code-division systems, as would be readily understood by one of ordinary skill in the art.

Obviously many modifications and variations of the present invention are possible in the light of the above teachings. It is therefore to be understood that the scope of the invention should be determined by referring to the following appended claims.

We claim:

1. A Group TDMA method of providing multiple-access in a multiple destination, multiple node wireless network, said network including a first destination having a first group of nodes within communication range thereof and a second destination having a second group of nodes within communication range thereof, wherein both said first and second destinations include a third group of nodes within communication range thereof of both said first and second destinations, and wherein each group of nodes is assigned a periodically recurring set of time slots for transmitting to a designated destination, comprising:

providing a frame of a specified duration; dividing the frame into a number of fixed-length time slots;

assigning a fraction 1−x of the time slots to said first and second groups of nodes;

assigning a fraction x of the time slots to said third group;

subdividing said third group into a fourth group of nodes and a fifth group of nodes;

assigning a fraction y of the fraction x time slots to said fourth group for transmission to said first destination and a fraction 1−y of the fraction x time slots to said fifth group for transmission to said second destination;

applying a multiple-access protocol in each group in its assigned set of time slots;

optimizing the values of x and y in order to realize the maximum possible value of stable throughput rate λ*, and transmitting to said designated destination in response to the maximum possible value of stable throughput rate λ*.

2. A method as in claim 1, further comprising adjusting the frame duration as necessary to facilitate the implementation of the optimal values of x and y.

3. A method as in claim 1, wherein the optimal values of x and y are determined according to the equations:

$$x^* = \frac{f_3}{f_3 + \max(f_1, f_2)}$$

$$y^* = \frac{f_{31}}{f_3}$$

$$\lambda^* = \frac{S_{\max}}{f_3 + \max(f_1, f_2)}$$

where x* is the optimal value of x, y* is the optimal value of y, and λ is the overall arrival rate to the network and is divided among the groups as follows:

$f_i$=fraction of arrivals from Group i, i∈{1, 2, 3}

$f_{3j}$=fraction of arrivals from Group 3j, j∈{1, 2} and where $f_1+f_2+f_{31}+f_{32}=1$ and $f_3=f_{31}+f_{32}$.

4. A method as in claim 1, wherein nodes in said first group are allowed to transmit during the slots that are allocated to said fifth group and nodes in said second group are allowed to transmit during the slots that are allocated to said fourth group.

5. A method as in claim 1, wherein the network comprises more than two destinations.

6. A method as in claim 1, wherein the multiple destination, multiple node wireless network uses a FCFS protocol.

7. A method as in claim 6, further comprising adjusting the frame duration as necessary to facilitate the implementation of the optimal values of x and y.

8. A method as in claim 6, wherein the optimal values of x and y are determined according to the equations:

$$x^* = \frac{f_3}{f_3 + \max(f_1, f_2)}$$

$$y^* = \frac{f_{31}}{f_3}$$

$$\lambda^* = \frac{S_{\max}}{f_3 + \max(f_1, f_2)}$$

where x* is the optimal value of x, y* is the optimal value of y, and λ is the overall arrival rate to the network and is divided among the groups as follows:

$f_i$=fraction of arrivals from Group i, i∈{1, 2, 3}

$f_{3j}$=fraction of arrivals from Group 3j, j∈{1, 2} and where $f_1+f_2+f_{31}+f_{32}=1$ and $f_3=f_{31}+f_{32}$.

9. A method as in claim 6, wherein nodes in said first group are allowed to transmit during the slots that are allocated to said fifth group and nodes in said second group are allowed to transmit during the slots that are allocated to said fourth group.

10. A method as in claim 6, wherein the network comprises more than two destinations.

11. A method as in claim 1, wherein the multiple destination, multiple node wireless network uses a slotted Aloha protocol.

12. A method as in claim 11, further comprising adjusting the frame duration as necessary to correspond to the optimal values of x and y.

13. A method as in claim 11, wherein the optimal values of x and y are determined according to the equations:

$$x^* = \frac{f_3}{f_3 + \max(f_1, f_2)}$$

$$y^* = \frac{f_{31}}{f_3}$$

$$\lambda^* = \frac{S_{\max}}{f_3 + \max(f_1, f_2)}$$

where x* is the optimal value of x, y* is the optimal value of y, and λ is the overall arrival rate to the network and is divided among the groups as follows:

$f_i$=fraction of arrivals from Group i, i∈{1, 2, 3}

$f_{3j}$=fraction of arrivals from Group 3j, j∈{1, 2} and where $f_1+f_2+f_{31}+f_{32}=1$ and $f_3=f_{31}+f_{32}$.

14. A method as in claim 11, wherein nodes in said first group are allowed to transmit during the slots that are allocated to said fifth group and nodes in said second group are allowed to transmit during the slots that are allocated to said fourth group.

15. A method as in claim 11, wherein the network comprises more than two destinations.

16. A Group TDMA multiple access, multiple destination, multiple node wireless network, comprising:
a first destination having a first group of nodes within communication range thereof;
a second destination having a second group of nodes within communication range thereof;
wherein said first and second destinations further include a third group of nodes within communication range thereof of both said first and second destinations and wherein each group of nodes is assigned a periodically recurring set of time slots for transmitting to a designated destination; and
a processor, said processor programmed for:
dividing the frame into a number of fixed-length time slots;
assigning a fraction 1−x of the time slots to said first and second groups of nodes;
assigning a fraction x of the time slots to said third group;
subdividing said third group into a fourth group of nodes and a fifth group of nodes;
assigning a fraction y of the fraction x time slots to said fourth group for transmission to said first destination and a fraction 1−y of the fraction x time slots to said fifth group for transmission to said second destination;
applying a multiple-access protocol to each group in its assigned set of time slots;
optimizing the values of x and y in order to realize the maximum possible value of stable throughput rate λ*, and transmitting to said designated destination in response to the maximum possible value of stable throughput rate λ*.

17. A network as in claim 16, wherein the frame duration is adjusted as necessary to correspond to the optimal values of x and y.

18. A network as in claim 16, wherein the optimal values of x and y are determined according to the equations:

$$x^* = \frac{f_3}{f_3 + \max(f_1, f_2)}$$

$$y^* = \frac{f_{31}}{f_3}$$

$$\lambda^* = \frac{S_{\max}}{f_3 + \max(f_1, f_2)}$$

where x* is the optimal value of x, y* is the optimal value of y, and λ is the overall arrival rate to the network and is divided among the groups as follows:

$f_i$=fraction of arrivals from Group i, i∈{1, 2, 3}

$f_{3j}$=fraction of arrivals from Group 3j, j∈{1, 2} and where $f_1+f_2+f_{31}+f_{32}=1$ and $f_3=f_{31}+f_{32}$.

19. A network as in claim 16, wherein nodes in said first group are allowed to transmit during the slots that are allocated to said fifth group and nodes in said second group are allowed to transmit during the slots that are allocated to said fourth group.

20. A network as in claim 16, wherein the network comprises more than two destinations.

21. A network as in claim 16, wherein the network uses a FCFS protocol.

22. A network as in claim 21, wherein the frame duration is adjusted as necessary to correspond to the optimal values of x and y.

23. A network as in claim 21, wherein the optimal values of x and y are determined according to the equations:

$$x^* = \frac{f_3}{f_3 + \max(f_1, f_2)}$$

$$y^* = \frac{f_{31}}{f_3}$$

$$\lambda^* = \frac{S_{\max}}{f_3 + \max(f_1, f_2)}$$

where x* is the optimal value of x, y* is the optimal value of y, and λ is the overall arrival rate to the network and is divided among the groups as follows:

$f_i$=fraction of arrivals from Group i, i∈{1, 2, 3}

$f_{3j}$=fraction of arrivals from Group 3j, j∈{1, 2} and where $f_1+f_2+f_{31}+f_{32}=1$ and $f_3=f_{31}+f_{32}$.

24. A network as in claim 21, wherein nodes in said first group are allowed to transmit during the slots that are allocated to said fifth group and nodes in said second group are allowed to transmit during the slots that are allocated to said fourth group.

25. A method as in claim 21, wherein the network comprises more than two destinations.

26. A network as in claim 16, wherein the network uses a slotted Aloha protocol.

27. A network as in claim 26, wherein the frame duration is adjusted as necessary to correspond to the optimal values of x and y.

28. A network as in claim 26, wherein the optimal values of x and y are determined according to the equations:

$$x^* = \frac{f_3}{f_3 + \max(f_1, f_2)}$$

$$y^* = \frac{f_{31}}{f_3}$$

$$\lambda^* = \frac{S_{\max}}{f_3 + \max(f_1, f_2)}$$

where x* is the optimal value of x, y* is the optimal value of y, and λ is the overall arrival rate to the network and is divided among the groups as follows:

$f_i$=fraction of arrivals from Group i, i∈{1, 2, 3}

$f_{3j}$=fraction of arrivals from Group 3j, j∈{1, 2} and where $f_1+f_2+f_{31}+f_{32}=1$ and $f_3=f_{31}+f_{32}$.

29. A method as in claim 26, wherein nodes in said first group are allowed to transmit during the slots that are allocated to said fifth group and nodes in said second group are allowed to transmit during the slots that are allocated to said fourth group.

30. A network as in claim 26, wherein the network comprises more than two destinations.

* * * * *